United States Patent [19]

Abo et al.

[11] Patent Number: 5,149,999
[45] Date of Patent: Sep. 22, 1992

[54] POWER TOOL WITH IMPROVED INTERNAL WIRING STRUCTURE

[75] Inventors: Kimitaka Abo, Mito; Yoshio Osada; Junichi Kikuchi, both of Katsuta, all of Japan

[73] Assignee: Hitachi Koki Company, Limited, Tokyo, Japan

[21] Appl. No.: 617,103

[22] Filed: Nov. 21, 1990

[51] Int. Cl.⁵ .................. H01R 39/38; H02K 13/00
[52] U.S. Cl. .................... 310/239; 310/242; 310/89; 310/128; 310/50
[58] Field of Search .............. 310/239, 242, 89, 128, 310/273, 50, 71, 254, 241, 248, 45, 184, 46; 439/732

[56] References Cited

U.S. PATENT DOCUMENTS

| | | | |
|---|---|---|---|
| 3,387,155 | 6/1968 | Krulls | 310/239 |
| 3,842,302 | 10/1974 | Apostoleris | 310/239 |
| 3,979,615 | 9/1976 | Neff | 310/71 |
| 4,012,106 | 3/1977 | Filson | 339/211 |
| 4,075,523 | 2/1978 | Lafferty, Sr. | 310/239 |
| 4,322,647 | 3/1982 | Neroda et al. | 310/71 |
| 4,673,834 | 6/1987 | Wrobel | 310/71 |
| 4,851,725 | 7/1989 | Keck | 439/732 |

Primary Examiner—William H. Beha, Jr.
Assistant Examiner—E. H. To
Attorney, Agent, or Firm—Lowe, Price, LeBlanc & Becker

[57] ABSTRACT

A power tool includes an internal wiring structure having a first terminal board secured to a commutator motor stator and a second terminal board releasably engaged with the first terminal board to electrically connect terminals on the first and second terminal board. The second terminal board includes first and second conductive resilient brush terminals respectively resiliently engaged with first and second conductive brush holders when the stator is installed in a housing of the power tool. Internal wiring of the power tool is thereby automatically completed upon installation of the stator in the housing.

5 Claims, 3 Drawing Sheets

POWER TOOL WITH IMPROVED INTERNAL WIRING STRUCTURE

BACKGROUND OF THE INVENTION

1. Field of the Invention

The present invention relates generally to power tools, and more particularly to internal wiring structure of such a power tool which is driven by a commutator motor.

2. Description of the Prior Art

Conventional power tools driven by a commutator motor include an internal wiring structure which comprises, as shown in FIG. 5, a terminal board 1 disposed on one end of a stator 2 of the commutator motor, lead wires 3 connected at one end to terminals 4 on the terminal board 1 and at opposite end to brush terminals 5, and lead wires 6 connected at one end to the terminals 4 for connection to a power cord. The lead wires 3 must be short to avoid a breakage or an insulation failure which would otherwise occur due to rubbing against a rotor (not shown) or due to jamming between other structural components when longer lead wires are used. With the use of these short lead wires 3, the stator 2 must be placed in a housing (not shown) of the power tool before making the connection between the brush terminals 6 joined with the terminal board 1 on the stator 2 and brush holders mounted on the housing.

With the stator 2 thus installed, operator's fingers, a jig or an attachment tool finds no room in the housing for ready access to the brush holders. Consequently, brush holes in the respective brush holders and a narrow internal space in the stator 2 are used when the brush terminals 5 are connected to the brush holders. Such connecting operation is tedious and time-consuming and requires a great deal of skill, which constitute to the reduction of the overall assembly time of the power tool.

SUMMARY OF THE INVENTION

With the foregoing drawbacks of the prior art in view, it is an object of the present invention to provide a power tool having an internal wiring structure which provides a considerable reduction in the overall assembly time of the power tool and in the manufacturing cost of the power tool.

A further object of the present invention is to provide a power tool having an internal wiring structure which is protected from frictional contact with the rotor of a commutator motor and hence is free from insulation failure.

In accordance with one aspect of the invention, a power tool is driven by a commutator motor disposed in a housing for the tool. The commutator motor includes a stator with a stator winding wound around it and first and second electrically conductive brush holders secured to the housing. An internal wiring structure electrically connecting the stator winding and brush holders includes: (i) a first electrically insulating terminal board having a plurality of first terminals connected to ends of the stator winding, and (ii) a second electrically insulating terminal board disposed in confrontation with the first terminal board and having plural second terminals electrically connected with the first terminals, respectively. A pair of resilient electrically conductive brush terminals resiliently engage the brush holders. The first and second terminal boards releasably engage each other to electrically connect the first and second terminals.

Preferably the brush terminals snap engage the brush holders. Each of the brush terminals has a pair of confronting arcuate resilient arms defining, in its free state, a segment of the circumference of a circle having a diameter smaller than the diameter of the brush holders. The outwardly flaring guide fingers extend from distal ends of the resilient arms.

In accordance with a further aspect of the invention, a power tool comprises a housing having a longitudinal axis and an end face. A commutator motor in the housing has an output shaft extending in the direction of the axis for driving a load implement of the tool. The commutator motor includes a stator with a stator winding wound around it and first and second electrically conductive brush holders secured to the housing and respectively holding therein first and second brushes. The motor includes first and second output leads. An internal wiring structure electrically connects the stator winding and brush holders. The internal winding structure includes first and second electrically insulting terminals. A first electrically insulating terminal board in the housing has a planar face at right angles to the longitudinal axis. The planar face is located on one end of the motor. The first terminal board carries first and second terminals respectively connected to the first and second output leads. The first and second terminals extend in the direction of the axis. A second electrically insulating terminal board in the housing has a planar face at right angles to the longitudinal axis located between the first terminal board and the housing end face. The second terminal board carries third and fourth terminals extending in the direction of the axis and is in confronting relation with the first and second terminals, respectively. The first and third terminals re snap engaged to provide an electrical connection between them. The second and fourth terminals are snap engaged to provide an electrical connection between them. Power line leads held in situ by the second terminal board are electrically and mechanically connected to the third and fourth terminals.

The above and other objects, features and advantages of the present invention will become more apparent from the following description when making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
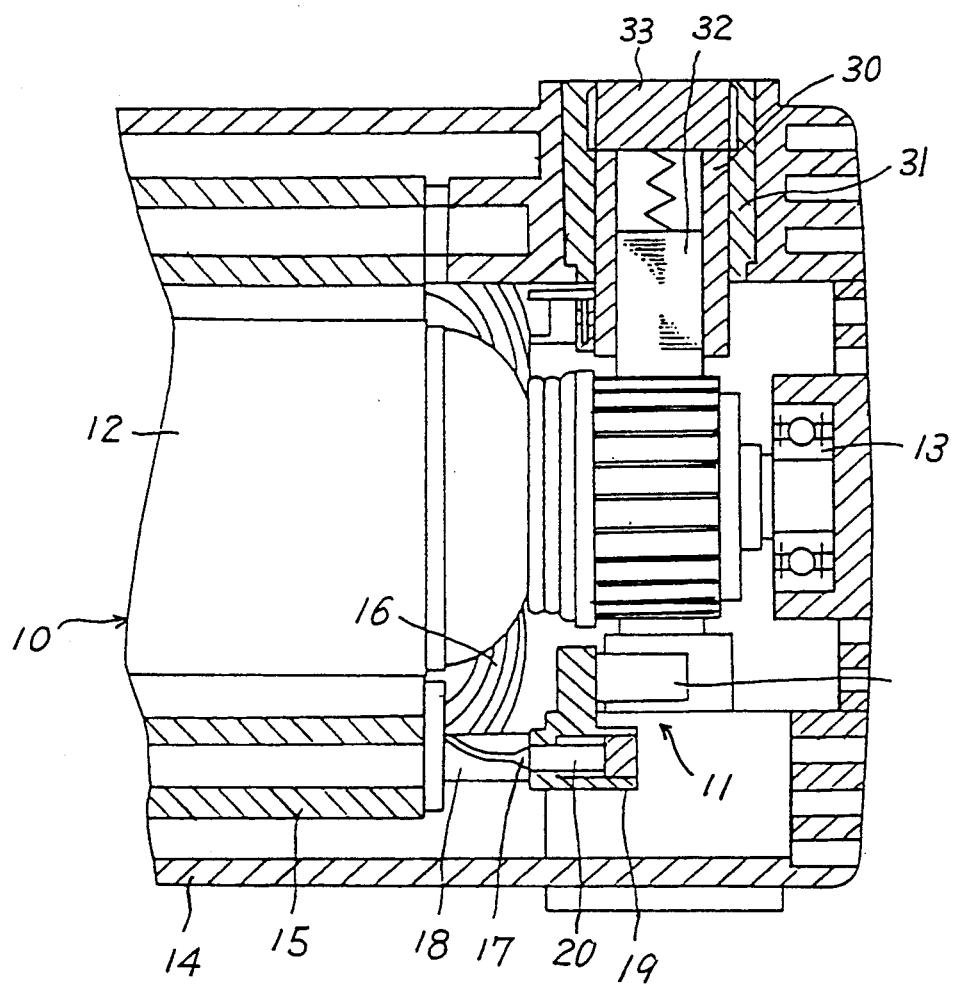
FIG. 1 is a fragmentary cross-sectional view of an electric tool driven by a commutator motor and having an improved internal wiring structure according to the present invention.

Referring now to the drawings wherein like reference characters designate corresponding parts throughout several views, in FIG. 1 is shown a portion of a power tool driven by a commutator motor 10; the tool has an internal wiring structure 11 according to this invention.

The commutator motor 10 includes a rotor 12 rotatably supported at its opposite ends by a pair of bearings 13 (only one shown) mounted on a housing 14 of the power tool. The rotor 12 is disposed in a stator 15 secured to the housing 14 and having a stator winding 16 wound thereon. Leading and trailing ends (not shown) of the stator winding 16 are connected to a plurality of terminals 17 provided on a first terminal board 18. The first terminal board 18 which constitutes a part of the internal wiring structure 11 is formed of an electrically insulating material and secured to one end of the stator 15. The first terminal board 18 is assembled with a second terminal board 19 which is disposed in confrontation to the first terminal board 18.

The second terminal board 19 which constitutes a part of the internal wiring structure 11 is formed of an electrically insulating material and has a plurality (four in the illustrated embodiment) of terminals 20 corresponding in number to the number of the terminals 17 on the first terminal board 18. The first terminals 17 are in the form of a receptacle or socket, while the second terminals 20 are in the form of a tongue or stud snugly receivable in the socket of the corresponding terminal 17. The first and second terminals 17, 20 thus formed are releasably engageable with each other when the second terminal boards 18, 19 are forced together.

Figure 2:
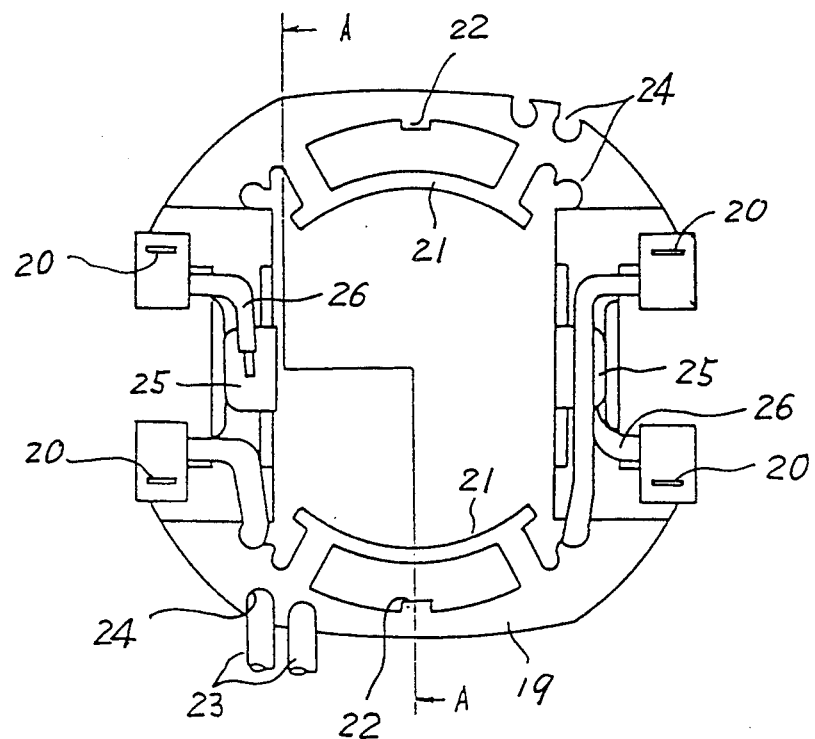
FIG. 2 is a front elevational view of a terminal board assembly constituting a part of the internal wiring structure.

As shown in FIG. 2, the second terminal board 19 is in the shape of a ring and includes a pair of diametrically opposed arcuate ribs 21 extending along an inner peripheral edge for guiding cooling air, and a pair of diametrically opposite projections 22 disposed radially outwardly of the arcuate rigs 21 for retaining two lead wires 23. A plurality of grooves 24, formed at suitable positions in inner and outer peripheral edges of the ring-shaped second terminal board 19, hold lead wires 23. The second terminals 20 are separated into two groups each of which is composed of two terminals 20 and disposed on one side of a symmetrical central line extending diametrically across the arcuate ribs 21. One of the lead wires 23 is connected to one terminal 20 of one of the two terminal groups, while the other lead wire 23 is connected to one terminal 20 of the other terminal group. The second terminal board 19 further includes a pair of brush terminals 25 each disposed between respective one pair of the terminals 20. Each of the brush terminals 25 is connected by a connecting lead wire 26 to the other one of each respective group of the terminals 20. A switch and a power cord (neither shown) are connected to the second terminals 20.

Figure 3:
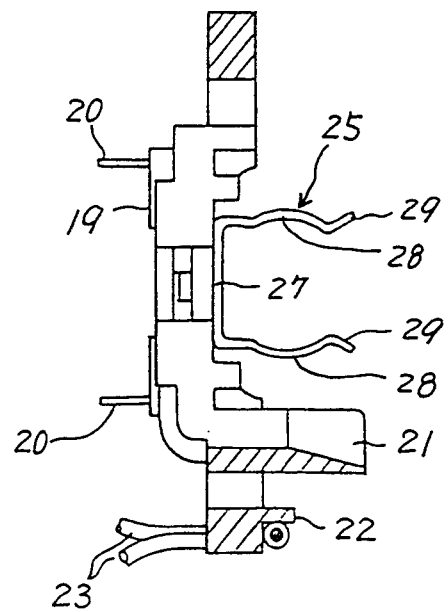
FIG. 3 is a cross-sectional view taken along line A—A of FIG. 2.
Figure 4:
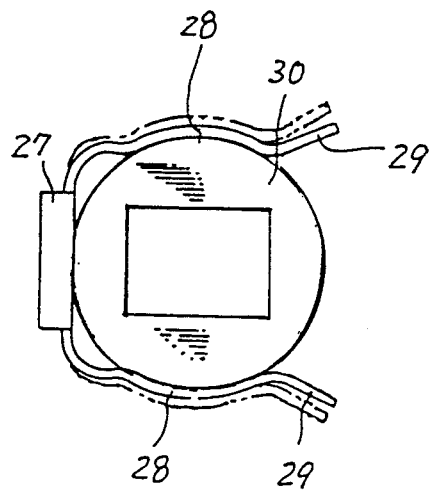
FIG. 4 is an enlarged side view of a brush terminal constituting a part of the internal wiring structure.
Figure 5:
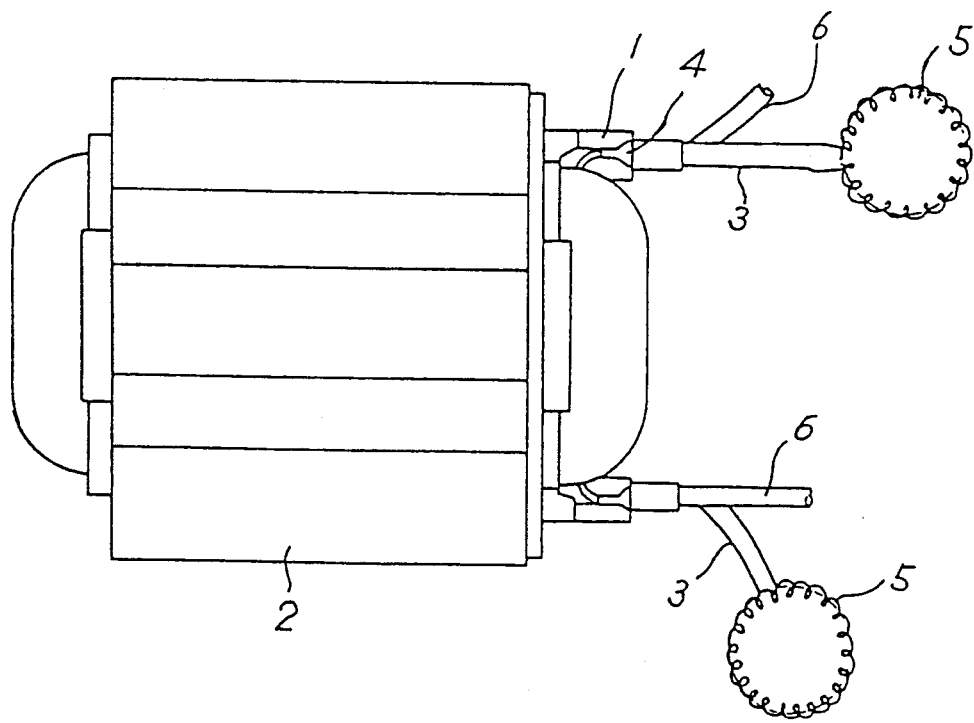
FIG. 5 is a side view of an internal wiring structure of a conventional power tool.

Each of brush terminals 25 is formed of an electrically conductive, resilient material and has a substantially U shape, as shown in FIGS. 3 and 4. The U-shaped brush terminals 25 includes a flat base 27 secured to the second terminal board 19, a pair of confronting arcuate grip arms 28, 28 extending from opposite ends of the base 27, and a pair of outwardly flaring guide fingers 29 integral with distal ends of the respective arms 28, 28. The arcuate grip arms 28, in their free state, define a segment of the circumference of a circle having a diameter smaller than the diameter of brush holders 30, so that the arms resiliently hold the corresponding ones of the brush holders 30 when the brush terminals 25 are snapped with the brush holders 30.

To assemble the power tool of the foregoing construction, the brush holders 30 (formed of an electrically conductive material) are mounted on the housing 14 with tubular insulators 31 (FIG. 1) disposed therebetween. After the first terminal board 18 is secured to the stator 15, the second terminal board 19 is forced against the first terminal board 18, so that the second terminals 20 composed of studs are snugly received in the sockets of the corresponding first terminals 17. Then, the stator 15 with the combined first and second terminal boards 18, 19 retained therein is assembled with the housing 14 by forcing the stator 15 into the housing 14 with the grip arms 28 of the brush terminals 25 directed forward. The forward movement of the stator 15 causes the guide fingers 29 of each brush terminal 25 to engage a corresponding one of the brush holders 30 and then gradually spread the grip arms 28 against the resiliency thereof, as indicated by the phantom lines shown in FIG. 4. Since the guide fingers 29 are outwardly flared, the brush holder 30 is reliably guided between the grip arms 28. As the stator 15 is further advanced, the distal ends of the grip arms 28 move past the center of the brush holder 30 whereupon the grip arms 28 spring back toward each other to resiliently grip the brush holder 30 therebetween. The brush terminals 25 and the brush holders 30 thus snap together. In this instance, the brush terminals 25 are electrically connected to the brush holders 30 and, at the same time, an internal wiring of the power tool is completed. Then, the rotor 12 is mounted in the stator 15. After spring-loaded brushes 32 are received in the respective brush holders 30, end plugs 33 of insulating material are threaded into the tubular insulators 31 to close outer ends of the respective brush holders 30.

As described above, by the use of brush terminals of conductive resilient material, the connection between the brush terminals and brush holders of conductive material can be made by merely forcing them into frictional engagement with each other, without using a jig and an attachment tool. Furthermore, internal wiring of the power tool is automatically completed upon installation of the stator into the housing. Such a wiring operation obviates the need for a skilled worker and provides a considerable reduction of the overall assembly time of the power tool. The lead wires are centrally located on the second terminal board and completely protected from frictional contact with the rotor, and hence the internal wiring structure is free from insulating failure. A power tool having the internal wiring structure can of the invention be manufactured at a low cost, operates safely and is easy to maintain.

Obviously various minor changes and modifications of the present invention are possible in the light of the above teaching. It is therefore to be understood that within the scope of the appended claims the invention may be practiced otherwise than as specifically described.

What is claimed is:
1. A power tool comprising:
   (a) a housing;
   (b) a commutator motor disposed in said housing for driving the tool, said commutator motor including a stator with a stator winding wound around it and first and second electrically conductive brush hold- ers secured to said housing and respectively holding therein first and second brushes; and (c) an internal wiring structure electrically connecting said stator winding and said brush holders, said internal winding structure including (i) a first terminal board of electrically insulating material having a plurality of first terminals connected to ends of said stator winding, and (ii) a second terminal board of electrically insulating material disposed in confrontation with said first terminal board and having a plurality of second terminals electrically connected with said first terminals, respectively, and a pair of resilient brush terminals of electrically conductive material resiliently engaged with said brush holders, respectively, said first and second terminal boards being releasably engaged with each other to electrically connect said first and second terminals.

2. A power tool according to claim 1, wherein said brush terminals are snap engaged with said brush holders.

3. A power tool according to claim 2, wherein each of said brush terminals has a pair of confronting arcuate resilient arms defining, in its free state, a segment of the circumference of a circle having a diameter smaller than the diameter of said brush holders.

4. A power tool according to claim 3, wherein said arcuate resilient arms have a pair of outwardly flaring guide fingers extending from distal ends of said resilient arms.

5. A power tool comprising a housing having a longitudinal axis and an end face, a commutator motor in said housing having an output shaft extending in the direction of the axis for driving a load implement of the tool, said commutator motor including a stator with a stator winding wound around it and first and second electrically conductive brush holders secured to said housing and respectively holding therein first and second brushes, the motor including first and second output leads, an internal wiring structure electrically connecting said stator winding and said brush holders, said internal winding structure including first and second electrically insulating terminals, a first electrically insulating terminal board in said housing having a planar face at right angles to the longitudinal axis, the planar face being located on one end of said motor, said first terminal board carrying first and second terminals respectively connected to said first and second output leads, said first and second terminals extending in the direction of the axis, a second electrically insulating terminal board in said housing having a planar face at right angles to the longitudinal axis located between the first terminal board and the housing end face, said second terminal board carrying third and fourth terminals extending in the direction of the axis and being in confronting relation with the first and second terminals, respectively, the first and third terminals being snap engaged to provide an electrical connection between them, the second and fourth terminals being snap engaged to provide an electrical connection between them, and power line leads held in situ by the second terminal board electrically and mechanically connected to the third and fourth terminals.

* * * * *